United States Patent Office 3,051,722
Patented Aug. 28, 1962

3,051,722
5-PYRROLIDONE-2-CARBOXAMIDES
John H. Biel, Milwaukee, Wis., assignor to Lakeside Laboratories, Inc., a corporation of Delaware
No Drawing. Filed Oct. 21, 1960, Ser. No. 63,990
3 Claims. (Cl. 260—319)

This invention relates to chemical compounds having physiological activity. More particularly, this invention is concerned with novel derivatives of therapeutically active amines of reduced toxicity and side effects and improved therapeutic properties.

This application is a continuation-in-part of my copending application Serial No. 48,859 filed August 11, 1960 and Serial No. 11,142 filed February 26, 1960, both now abandoned.

It is well known that many amine derivatives have physiological activity and that some are used therapeutically in the treatment of humans and animals. These amine derivatives exert a variety of actions, some of which they have in common, including central nervous system stimulation and hypotensive, vasoconstrictor, appetite depressant, bronchodilator and ganglionic blocking properties. Many of the amines, however, have undesirably low therapeutic indices and often induce toxicity symptoms which restrict their use.

According to the present invention it has been found that by converting physiologically active amines to amides of 5-pyrrolidine-2-carboxylic acid, novel derivatives are obtained having the desired physiological activities possessed by the parent amines but of greatly improved therapeutic properties and therapeutic ratios. The 5-pyrrolidone-2-carboxyl group apparently has the broad capacity of enhancing the desirable, and reducing the undesirable, physiological properties of the parent amines.

Some of the amides which are provided by this invention and which have improved therapeutic properties over the corresponding parent amines are the amides of 5-pyrrolidone-2-carboxylic acid with physiologically active amines such as aminopyrine, ephedrine, norephedrine, arterenol, N-[2-(3,4-methylenedioxyphenylisopropyl)]-norepinephrine (Caytine), histamine, mecamylamine (Inversine), N-nor-methyl mecamylamine, serotonin, 2,2,6,6-tetramethylpiperidine, gamma-aminobutyric acid and beta-1,2,3,4-tetrahydronaphthylamine as well as the novel 5-pyrrolidone-2-carboxamides of the formula

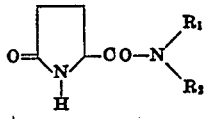

wherein $R_1$ represents hydrogen, alkyl and particularly lower alkyls of 1 to 8 carbons such as methyl, ethyl, propyl, isopropyl and butyl, alkenyl and particularly lower alkenyls as of 3 to 8 carbons such as allyl, crotonyl, pentenyl and hexenyl, and alkynyls and particularly lower alkynyls as of 3 to 8 carbons such as propargyl, 2-butynyl and 3-pentynyl, and $R_2$ represents aralkyls such as phenyl-lower alkyls including benzyl, phenethyl, phenylisopropyl and phenylbutyl, cyclic groups such as the 1,2,3,4-tetrahydronaphthyl already named, heterocyclic groups such as thienyl, pyridyl, indolyl, furyl and pyrrolyl, heterocyclic-lower alkyl groups such as thienylmethyl, furfuryl, indolylmethyl, indolylethyl, indolylisopropyl, indolylbutyl and 2-methyl-3-indolylbutyl, and groups in which

represents a cyclic amino group such as piperidino, morpholino, pyrrolidino, 2-phenyl-3-methylmorpholino, 3-hydroxypiperidino, 4-hydroxypiperidino, 3-acetoxypiperidino, indolino and isoindolino.

The novel 5-pyrrolidone-2-carboxamides can be produced by condensing an appropriate amine with a 5-pyrrolidone-2-carboxylic acid having an "activated" carboxyl group such as the acid azide of the formula

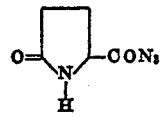

the mixed anhydride of the formula

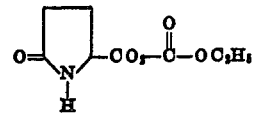

the cyanomethyl ester of the formula

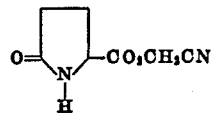

or a p-nitrophenylthio ester or p-nitrophenyl ester of the formulas

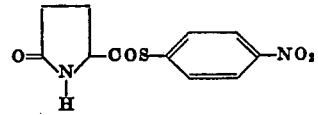

and

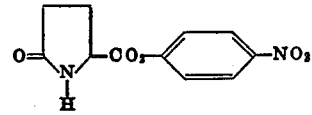

Some of the amines which can be used in the reaction, in addition to those named above, are N-benzyl-N-propargylamine,
N-1-phenyl-2-propylamine,
2-phenylcyclopropylamine,
2-furfurylmethylamine,
1-(2-thienyl)-2-propylamine,
1-(3-indolyl)-2-propylamine,
1-(2-methyl-3-indolyl)-2-butylamine,
1-(3-indolyl)-2-butyl-amine,
piperidine,
2,2,6,6-tetramethylpiperidine,
2-phenyl-3-methyl morpholine,
beta-1,2,3,4-tetrahydronaphthylamine,
N-(beta-1,3,3,4-tetrahydronaphthyl)-N-propargylamine,
3-hydroxypiperidine,
4-hydroxypiperidine,
3-acetoxypiperidine,
benzylamine,
phenethylamine,
N-benzyl-N-ethylamine,
morpholine and pyrrolidine.

The condensation reaction between the amine and a 5-pyrrolidone-2-carboxylic acid having an "activated" carboxyl group is effected by bringing the reactants together in a suitable liquid reaction medium such as ethanol or dichloromethane. The D or L or DL form of 5-pyrrolidone-2-carboxylic acid can be used in the reaction. A tertiaryamine such as triethylamine can be included in the reaction medium to remove any acid by-products formed. The reaction usually proceeds at room temperature although higher temperatures can be employed as needed. The desired product can be isolated from the reaction mixture by conventional procedures.

An alternative method of producing the compounds is by the condensation of an appropriate amine in the presence of 5-pyrrolidone-2-carboxylic acid, as the free acid, in the presence of a dehydrating agent such as dicyclohexylcarbodiimide, 1-cyclohexyl-3-(beta-morpholinoethyl)carbodiimide methyl tosylate, sodium phosphite or sodium pyrophosphite. The reaction is effected in a liquid reaction medium and at room temperature or slightly higher. After filtering, the product can be isolated from the reaction mixture by conventional means.

Representative amides thus formed are:

N-methyl-N-1-[2-hydroxy-2-(3,4-dihydroxyphenyl)-ethyl]-L-5-pyrrolidone-2-carboxamide,
N-1-[2-hydroxy-2-(3,4-dihydroxyphenyl)ethyl]-L-5-pyrrolidone-2-carboxamide,
N-methyl-N-2-[(3-hydroxy-3-phenyl)-propyl]-L-5-pyrrolidone-2-carboxamide,
N-2-[(3-hydroxy-3-phenyl)-propyl]-L-5-pyrrolidone-2-carboxamide,
N-methyl-N-2-isocamphanyl-L-5-pyrrolidone-2-carboxamide,
N-(1-phenyl-2-propyl)-L-5-pyrrolidone-2-carboxamide,
N-(2-phenylcyclopropyl)-5-pyrrolidone-2-carboxamide,
N-benzyl-N-propargyl-L-5-pyrrolidone-2-carboxamide,
N-1-alpha-thienyl-2-propyl-L-5-pyrrolidone2-carboxamide,
N-alpha-thienylmethyl-N-propargyl-L-5-pyrrolidone-2-carboxamide,
N-1-(3-indolyl)-2-butyl-L-5-pyrrolidone-2-carboxamide,
N-alpha-1,2,3,4-tetrahydronaphthyl-L-5-pyrrolidone-2-carboxamide,
N-L-5-pyrrolidone-2-carboxylpiperidine,
N-L-5-pyrrolidone-2-carboxyl-(2,2,6,6)-tetramethylpiperidine and
N-L-5-pyrrolidone-2-carboxyl-(2-phenyl-3-methyl)-morpholine.

The amides of the above formula, for the most part, are crystalline solids. They are useful as central stimulants, analeptic agents, and mood elevators and, therefore, might find therapeutic application in the treatment of mental depression. Some of the compounds are also inhibitors of the enzyme monoamine oxidase, a property that would tend to enhance their antidepressant action. Such agents would also be expected to be therapeutically effective in the treatment of angina pectoris, arthritis, high blood pressure, nonspecific inflammations and skin ulceration resulting from local ischemia. Some of the compounds are also appetite depressants.

Those known amines of established physiological activity when converted to amides of 5-pyrrolidone-2-carboxylic acid will still possess such activity but will have less side effects and reduced toxicity.

For pharmaceutical uses it is advisable to employ the L-5-pyrrolidone-2-carboxamides.

The amides can be administered to animals and humans as pure compounds. It is advisable, however, to first combine one or more of the novel compounds with a suitable pharmaceutical carrier to attain a more satisfactory size to dosage relationship.

Pharmaceutical carriers which the liquid or solid can be used. The preferred liquid carrier is water. Flavoring materials may be included in the solutions as desired.

Solid pharmaceutical carriers such as starch, sugar, talc and the like can be used to form powders. The powders can be used as such for direct administration to a patient or, instead, the powders can be added to suitable foods and liquids, including water, to facilitate administration.

The powders may also be used to make tablets and troches and in capsules. Suitable lubricants like magnesium stearate, binders such as gelatin and disintegrating agents like sodium carbonate in combination with citric acid can be used to form tablets. Suppositories can also be made containing these active amides.

Dosage unit forms such as tablets, capsules, troches and suppositories may contain any suitable predetermined amount of one or more of the active amides and they may be administered one or more at a time as prescribed. Such dosage unit forms can contain from about 1 to 50% or more of active amide but usually about 5 to 200 mgm. thereof.

The following examples are presented to illustrate the invention.

EXAMPLE 1

N-D,L-1-Phenyl-2-Propyl-L-5-Pyrrolidone-2-Carboxamide

To a mixture of 27.0 g. (0.20 mole) of D,L-1-phenyl-2-propylamine and 25.8 g. (0.20 mole) of L-5-pyrrolidone-2-carboxylic acid in 300 cc. of ethanol was added 43.2 g. (0.21 mole) of dicyclohexylcarbodiimide in the form of an alcoholic solution. The dicyclohexylurea which precipitated during the reaction was removed by filtration, the filtrate concentrated and the residue crystallized from acetonitrile, M.P. 182° C., yield 9.0 g.

Analysis.—Calcd. for $C_{14}H_{18}N_2O_2$: N, 11.52. Found: N, 11.47.

EXAMPLE 2

N-D-1-Phenyl-2-Propyl-L-5-Pyrrolidone-2-Carboxamide

To a mixture of 25.8 g. (0.20 mole) of L-5-pyrrolidone-2-carboxylic acid and 20.2 g. (0.20 mole) of triethylamine contained in 400 cc. of dichloromethane was added 21.6 cc. (0.20 mole) of ethyl chloroformate with stirring and cooling (0–10° C.). After stirring at this temperature for another 0.5 hour, 27 g. (0.20 mole) of d-amphetamine was added and the mixture allowed to stir at room temperature for 18 hours. The reaction mixture was washed with water and the organic phase concentrated to dryness. The residue was recrystallized from acetonitrile, M.P., 210–212° C.; yield 8 g.

Analysis.—Calcd. for $C_{14}H_{17}N_2O_2$: N, 11.52. Found: N, 11.32.

EXAMPLE 3

N-Benzyl-N-Propargyl-L-5-Pyrrolidone-2-Carboxamide

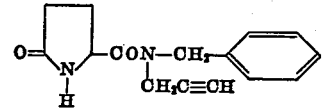

To the mixed anhydride formed from 25.8 g. (0.20 mole) of L-5-pyrrolidone-2-carboxylic acid, 20.2 g. (0.20 mole) of triethylamine and 21.6 cc. (0.20 mole) of ethyl chloroformate by the method described in Example 2 was added 31.4 g. (0.20 mole) of N-benzyl-N-propargylamine. The reaction mixture was stirred at room temperature for 18 hours and the product isolated in the manner described in Example 2.

EXAMPLE 4

N-1-(3-Indolyl)-2-Butyl-L-5-Pyrrolidone-2-Carboxamide

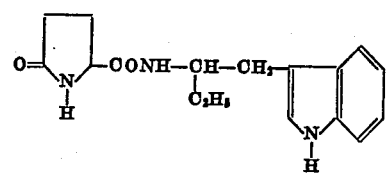

To a mixture of 37.6 g. (0.20 mole) of 1-(3-indolyl)-2-butylamine and 25.8 g. (0.20 mole) of L-5-pyrrolidone-2-carboxylic acid in 300 cc. of ethanol was added 43.2 g. (0.21 mole) of dicyclohexyl carbodiimide in the form of an alcoholic solution. After the removal of the dicyclohexylurea by filtration and of the solvent by distillation, the residue was crystallized from acetonitrile and the product isolated as a grayish, crystalline solid.

Various changes and modifications of the invention can be made and, to the extent that such variations incorporate the spirit of this invention, they are intended to be included within the scope of the appended claims.

What is claimed is:
1. N-1-(3-indolyl)-2-butyl-L-5-pyrrolidone-2-carboxamide.
2. N-(3-indolyl)-lower alkyl-5-pyrrolidone-2-carboxamide.
3. Compounds of the formula

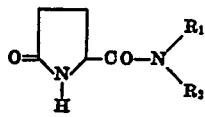

wherein $R_1$ is a member of the group consisting of hydrogen, lower alkyl, lower alkenyl and lower alkynyl and $R_2$ is indolyl-lower alkyl.

References Cited in the file of this patent
UNITED STATES PATENTS

| | | |
|---|---|---|
| 2,651,639 | Angier | Sept. 8, 1953 |
| 2,739,151 | Rosch et al. | Mar. 20, 1956 |
| 2,739,155 | Rosch et al. | Mar. 20, 1956 |
| 2,838,441 | Allen et al. | June 10, 1958 |
| 2,844,510 | Lorenz et al. | July 22, 1958 |